US010438284B1

(12) United States Patent
Mossoba et al.

(10) Patent No.: US 10,438,284 B1
(45) Date of Patent: Oct. 8, 2019

(54) ACCESSING A FINANCIAL SERVICE USING A MEDIA DEVICE

(71) Applicant: Capital One Services, LLC, McLean, VA (US)

(72) Inventors: Michael Mossoba, Arlington, VA (US); Mark Rothbaum, Washington, DC (US); Sarah J. Cunningham, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 15/943,224

(22) Filed: Apr. 2, 2018

(51) Int. Cl.
*G06Q 40/02* (2012.01)
*G08C 23/04* (2006.01)
*H04N 21/478* (2011.01)
*H04N 21/4415* (2011.01)
*H04N 21/475* (2011.01)
(Continued)

(52) U.S. Cl.
CPC .......... *G06Q 40/02* (2013.01); *G08C 23/04* (2013.01); *H04N 21/42221* (2013.01); *H04N 21/42222* (2013.01); *H04N 21/4415* (2013.01); *H04N 21/4753* (2013.01); *H04N 21/47805* (2013.01);
(Continued)

(58) Field of Classification Search
USPC ........................................................ 705/42
See application file for complete search history.

(56) References Cited

U.S. PATENT DOCUMENTS 6,970,098 B1  11/2005 Adams et al.
9,646,342 B2   5/2017 Calman et al.
(Continued)

FOREIGN PATENT DOCUMENTS

CN  102202092       9/2011
CN  103686274 A  *  3/2014
KR  20090081754 A  *  7/2009

OTHER PUBLICATIONS

Briel R., "Dedicated Netflix Button Comes to European Remotes," Broadband TV News, Apr. 2, 2015, 5 pages, XP055606470. [retrieved on Jul. 17, 2019] Retrieved from the Internet: [URL:https://www.broadbandtvnews.com/2015/04/02/dedicated-netflix-button-comes-to-european-remotes/].

(Continued)

*Primary Examiner* — Jason Borlinghaus
*Assistant Examiner* — Ambreen A. Alladin
(74) *Attorney, Agent, or Firm* — Harrity & Harrity, LLP

(57) ABSTRACT

Some examples, described herein, may include detecting a button press of a banking button on a remote control device associated with a media device. The banking button may be designated to access a financial institution. Some examples may include accessing a financial services platform based on detecting the button press. The financial services platform may be associated with the financial institution. Some examples may include providing account information, associated with a financial account of the financial institution, to the financial services platform. The account information, when provided, may cause the financial services platform to access the financial account. Some examples may include obtaining financial information, associated with the financial account, from the financial services platform. Some examples may include providing the financial information to the media device to enable the media device to present the financial information for display.

20 Claims, 7 Drawing Sheets

(51) Int. Cl.
*H04N 21/422* (2011.01)
*G06F 3/0482* (2013.01)

(52) U.S. Cl.
CPC ........ *G06F 3/0482* (2013.01); *G08C 2201/20* (2013.01)

(56) References Cited

U.S. PATENT DOCUMENTS

| | | | |
|---|---|---|---|
| 2003/0172283 A1 | 9/2003 | O'Hara | |
| 2006/0238373 A1 | 10/2006 | Sung | |
| 2009/0146779 A1 | 6/2009 | Kumar et al. | |
| 2011/0304778 A1 | 12/2011 | Roberts et al. | |
| 2015/0046335 A1 | 2/2015 | Huxham et al. | |
| 2015/0205622 A1* | 7/2015 | DiVincent | G06F 21/32 |
| | | | 713/100 |
| 2015/0205623 A1* | 7/2015 | DiVincent | G06F 21/32 |
| | | | 713/100 |
| 2015/0206366 A1* | 7/2015 | DiVincent | G07C 9/00158 |
| | | | 340/5.52 |
| 2016/0041742 A1 | 2/2016 | Takahara et al. | |
| 2016/0048667 A1 | 2/2016 | Kao | |
| 2016/0109954 A1* | 4/2016 | Harris | G06F 3/017 |
| | | | 345/156 |

OTHER PUBLICATIONS

Extended European Search Report for Application No. EP19165375.7, dated Jul. 30, 2019, 10 pages.

* cited by examiner

ACCESSING A FINANCIAL SERVICE USING A MEDIA DEVICE

BACKGROUND

Financial institutions (e.g., banks, credit unions, brokerage companies, and/or the like) often offer remote banking services to customers. These financial institutions may enable remote banking through applications, networks, and/or other financial services platforms. For example, customers may access bank accounts, perform transactions, receive service offers, and/or the like.

SUMMARY

According to some implementations, a method may include detecting, by a device, a button press of a banking button on a remote control device associated with a media device, wherein the banking button is designated to access a financial institution; accessing, by the device, a financial services platform based on detecting the button press, wherein the financial services platform is associated with the financial institution; automatically providing, by the device, account information, associated with a financial account of the financial institution, to the financial services platform, wherein the account information, when provided, causes the financial services platform to access the financial account; obtaining, by the device, financial information, associated with the financial account, from the financial services platform; and providing, by the device, the financial information to the media device to enable the media device to present the financial information for display.

According to some implementations, a remote control device, associated with a media device, may include a banking button, wherein the banking button is designated to solely access a financial services platform of a financial institution; one or more memories; and one or more processors, communicatively coupled to the one or more memories, to: receive account information associated with a financial account of the financial institution via an input component of the remote control device; store the account information in the one or more memories; detect a button press of the banking button; and provide the account information to the media device to cause the media device to: access the financial services platform based on detecting the button press, wherein the financial services platform is associated with the financial institution; automatically provide the account information, associated with the financial account of the financial institution, to the financial services platform, wherein the account information, when provided, causes the financial services platform to access the financial account; obtain financial information, associated with the financial account, from the financial services platform; and present the financial information for display to enable an interaction with the financial account via the remote control device.

According to some implementations, a non-transitory computer-readable medium may store instructions that, when executed by one or more processors, cause the one or more processors to: detect a first button press of a banking button of a remote control device associated with a media device, wherein the banking button is designated to initiate a communication with a financial institution; obtain first verification information associated with a first user that performed the first button press, wherein the first verification information identifies that the first user is associated with a first financial account of the financial institution; access a financial services platform based on obtaining the first verification information, wherein the financial services platform is associated with the financial institution; provide first account information, associated with the first financial account, to the financial services platform, wherein the first account information, when provided, causes the financial services platform to access the first financial account; obtain first financial information, associated with the first financial account, from the financial services platform; and provide the first financial information to permit the media device to present the first financial information.

DETAILED DESCRIPTION

Figure 1A:
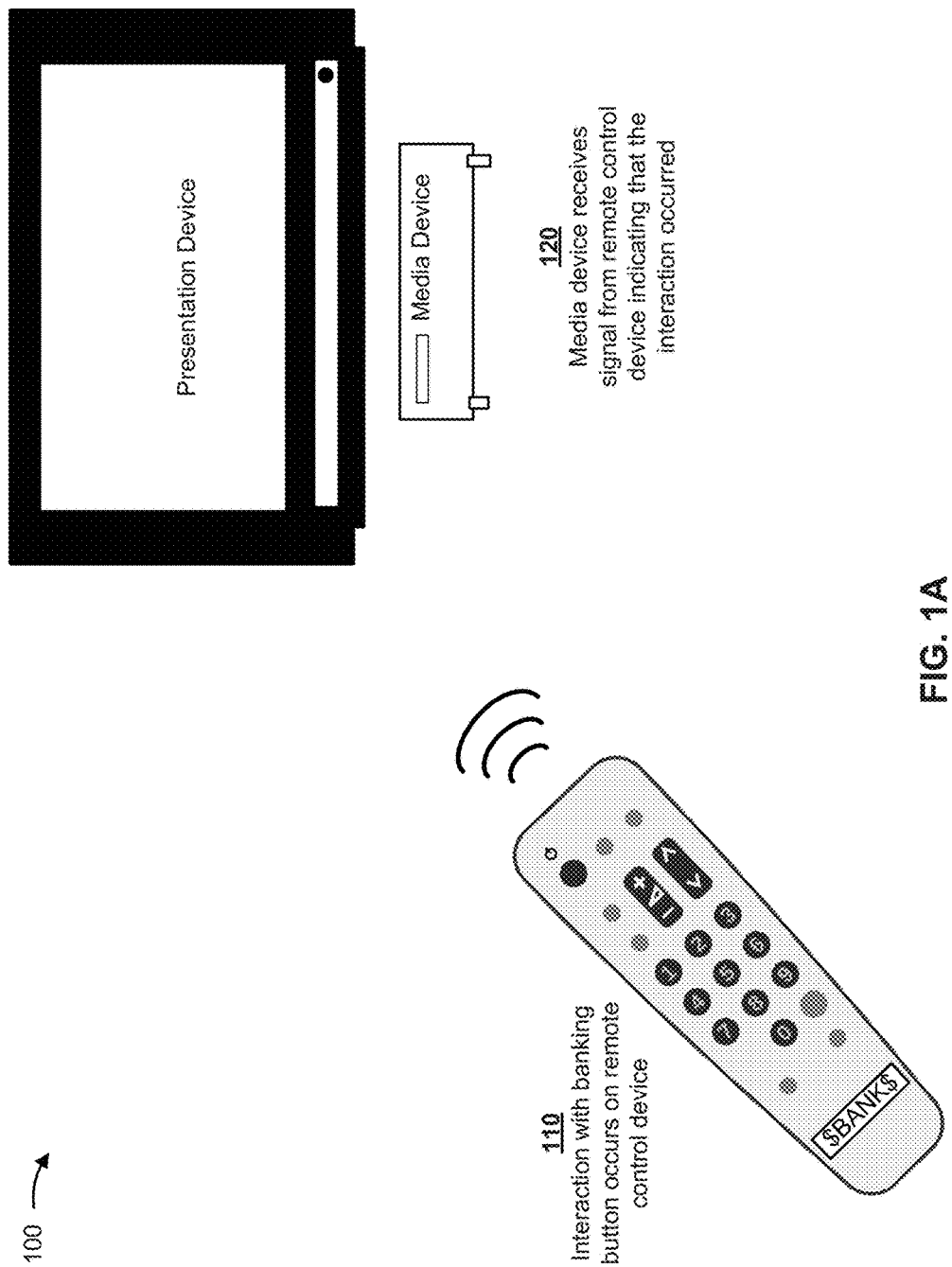
FIGS. 1A-1B are diagrams of an overview of an example implementation described herein.

The following detailed description of example implementations refers to the accompanying drawings. The same reference numbers in different drawings may identify the same or similar elements.

In many instances, a customer of a financial institution may access an account and/or a financial service of the financial institution from a user device (e.g., a smartphone, a tablet, a computer, and/or the like) via an application and/or other type of software. The user device can have a relatively small display screen, which can make certain interactions with the application difficult for certain customers (e.g., reading values associated with the account, providing a large enough display to enable multiple users and/or customers to view the financial information, and/or the like). Furthermore, in many instances, the user device may not be accessible to the user. For example, when the customer is viewing media on a television or other type of presentation device (e.g., a projector, a monitor, and/or the like), the user device of the customer may be in a different room of a home or building from where the customer is viewing the media. According to some implementations, described herein, a customer can access financial services of a financial institution utilizing a media device and a remote control associated with the media device.

In some implementations described herein, a customer may access and/or navigate a financial services platform utilizing a remote control device, associated with a media device, such that the customer can receive financial services and/or interact (e.g., view information, perform operations, and/or the like) with the financial services platform of a financial institution. In some implementations, the remote control device may include a designated input component or button (e.g., which may be referred to herein as a banking button) to access the financial services platform. For example, the customer can access the financial services by pressing the bank button, which can cause a media device to access and display a user interface of the financial services platform on a presentation device (e.g., a display of a television). Using the remote control device, the customer can then access and/or receive one or more of the financial services via the presentation device.

Accordingly, as described herein, a remote control device and/or a media device may enable a customer to access a financial account associated with a financial system using a presentation device (e.g., a television). As such, some implementations described herein may provide an enhanced user experience of accessing and/or receiving a financial service, over previous techniques, by enabling access to the financial service using a remote control device, a media device, and/or a presentation device (e.g., a television). Some implementations, described herein, enable quick access (e.g., at the touch of a single banking button of a remote control device) to financial information and/or a financial service via the presentation device (which is commonly in a same, readily available position). For example, a customer, with a single touch of a button (e.g., a banking button on a remote control device) can access the financial information and/or financial service, rather than requiring the customer to find a user device, unlock the user device, open an application associated with the financial institution, and access the financial service. As such, some implementations described herein can conserve processing resources and/or network resources by enabling quick access to a financial services platform by saving resources used to find, open, and/or log into the financial services platform.

Furthermore, examples herein can enable advantages of accessing or receiving financial services through a presentation device, such as enabling larger viewing of financial account information, enabling access to the financial account information from a readily available device (e.g., due to the presentation device commonly being in a fixed location), and/or the like. Accordingly, some implementations described herein can conserve resources lost or used when a user cannot interpret financial information on a relatively small display (e.g., due to making mistakes using a small display, due to attempting to zoom in/zoom out a window of the small display, navigate through the small display, and/or the like).

Figure 1B:
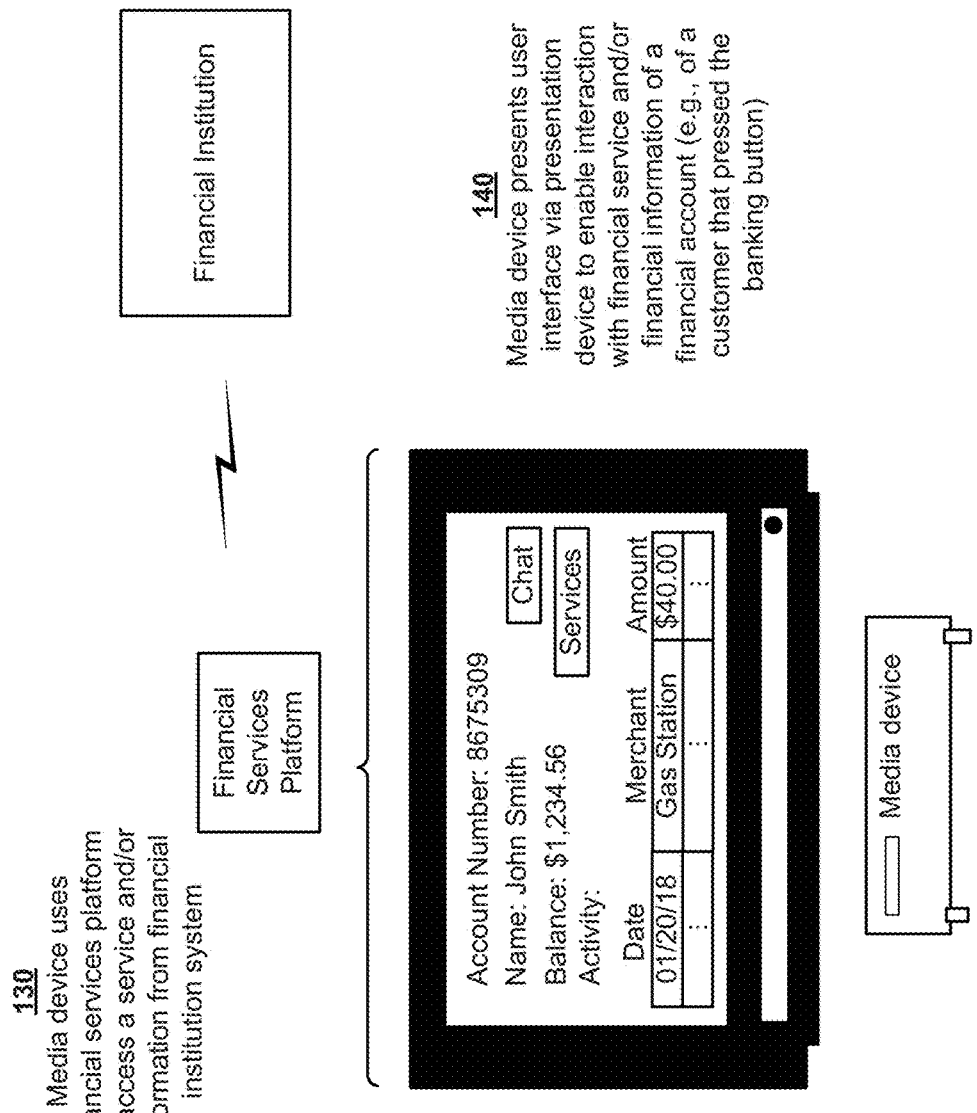

FIGS. 1A-1B are diagrams of an overview of an example implementation 100 described herein. As shown in example implementation 100, an example remote control device that is associated with a media device is used to access a financial services platform of a financial institution. A graphical user interface (GUI) associated with the financial services platform can be provided, through a presentation device associated with the media device, to present financial information associated with a financial account of the financial institution and/or enable a user (e.g., a customer, a representative of the financial institution, and/or the like) to perform an interaction with the financial institution (e.g., receive a financial service from the financial institution).

As shown in FIG. 1A, and by reference number 110, an interaction with a banking button (shown as a "BANK" button) occurs on the remote control device. The banking button may be any suitable input component of the remote control device. For example, the banking button may include one or more mechanical buttons (e.g., one or more spring-loaded buttons), one or more electronic buttons, one or more sensors, a keypad, a number pad, a touch screen, and/or the like. As such, the interaction with the banking button may involve the user (e.g., an authorized user, such as a customer or representative of the financial institution) performing a button press of the banking button.

As further shown in FIG. 1A, and by reference number 120, the media device receives a signal from the remote control device indicating that the interaction occurred. In some implementations, the signal may be an infrared (IR) signal, a radio frequency (RF) signal, a short range wireless communication signal (e.g., a BLUETOOTH® signal, a BLUETOOTH Low-Energy (BLE) signal, a Wi-Fi signal, and/or the like), and/or the like. In some implementations, the media device may receive, from the remote control device, information associated with the banking button being pressed. Such information may include customer identification information, verification information, biometric information, account information, and/or the like.

As shown in FIG. 1B, and by reference number 130, the media device uses the financial services platform to access a service and/or information (e.g., financial information associated with an account) from the financial institution. For example, based on the banking button being pressed and account information associated with a customer of the financial institution being received, the media device may access a financial account, of the financial institution, that is associated with the customer. The financial institution may include a system with one or more data structures that store information associated with the financial account. Additionally, or alternatively, the financial institution may enable and/or provide one or more financial services, as described herein, via the financial services platform. For example, the financial institution may provide a banking account service (e.g., opening a banking account, closing a banking account, performing a transaction associated with a banking account, and/or the like), a financial consultation service (e.g., receiving financial advice based on the customer's financial situation, based on the customer's goals, and/or the like), an investment banking service, a transaction card service (e.g., ordering a new transaction card, replacing a transaction card, accessing an account associated with a transaction card, and/or the like), a transaction service (e.g., withdrawal, deposit, currency transfer, bill payment, and/or the like), a loan service, a cash delivery service (e.g., a service that enables the customer to request and/or receive a cash delivery), and/or the like. In some implementations, a customer can interact with a representative of the financial institution via the media device and/or presentation device. For example, the customer may be able to hold an audio and/or video conference with the representative to receive one or more of the above services, and/or any other service offered by the financial institution.

As further shown in FIG. 1B, and by reference number 140, the media device presents the GUI via the presentation device to enable an interaction with a financial service and/or with financial information associated with the financial institution system. For example, as shown, the customer (or an authorized user), may receive access to (or view) account information (e.g., an account identifier, a name, a balance of the account, activity of the account, and/or the like) associated with an account of the customer. Additionally, or alternatively, the GUI may display and/or enable access to one or more financial services. In some implementations, a chat feature may be implemented via the media device and/or presentation device to enable the customer to text and/or speak with a financial representative of the financial institution. Such a feature can conserve processing resources that may otherwise be used by the customer to generate a message and/or send the message to the financial institution and/or receiving and accessing a response to the message from the financial institution.

In some implementations, the customer may interact with the GUI using the remote control device to navigate through the financial services and/or available offers (e.g., new products, services, and/or the like) associated with the financial institution. For example, the customer may navigate through the financial services platform, via the remote control device and/or GUI, to access and/or receive a service from the financial institution through the media device and/or presentation device. Accordingly, the customer, may have access to a financial account using a presentation device and remote control device associated with the presentation device and/or a media device associated with the presentation device.

In some implementations, the remote control device may be configured to access a particular financial account associated with the financial institution. For example, during a setup operation (e.g., when configuring the remote control device to control the media device and/or presentation device), the remote control device may receive information associated with the financial account through one or more input components of the remote control device. For example, a user (e.g., a customer and/or representative of a financial institution) may enter a banking account number, a bank routing number, a social security number, and/or the like that designate the remote to be operable to access that account. Furthermore, during the configuration of the remote control device, the customer and/or representative of the financial institution, may enter and/or provide verification information associated with the customer and/or the financial account. In such cases, the remote control device may store the account information and/or verification information in one or more memories of the remote control device.

According to some implementations, the remote control device and/or media device may obtain verification information associated with the customer to verify the identity of the user that interacted with the banking button. In such cases, verifying the identity of the user can prevent unauthorized users from accessing financial information from financial accounts of customers. Accordingly, the remote control device and/or media device may use the verification information to ensure the security of the financial information. In some implementations, the verification information may include a passcode and/or biometric information associated with accessing a financial account of the financial institution. In some implementations, the passcode may involve a passcode of a multi-factor authentication (e.g., which may involve sending the passcode to a user device associated with the user). The remote control device and/or media device may compare the verification information with information in a data structure (e.g., a table, an index, a task graph, a database, and/or the like) used to verify that the user has access to the financial account (e.g., based on the obtained verification information matching the information in the data structure).

In some implementations, the remote control device and/or media device may obtain biometric information from a user (e.g., the customer or an unauthorized user) using a biometric scanner on the remote control device and/or media device. For example, the biometric scanner may include one or more sensors, microphones, cameras, and/or the like that can be used to analyze biometric features of the user and generate corresponding biometric information associated with the customer. For example, the biometric scanner may perform one or more of a fingerprint scan, a palm scan, a facial recognition analysis, a voice recognition analysis, a gait recognition analysis, a retinal scan, and/or the like. The biometric scanner may compare the biometric information with a data structure of biometric signatures associated with one or more customers that are associated with one or more financial accounts of the financial institution. If the biometric information matches one or more of the biometric signatures, the remote control device and/or media device can verify that the user that performed the button press is the customer associated with the financial account of the financial institution. In some implementations, the biometric scanner may be associated with the banking button, such that when the banking button is pressed, the biometric scanner automatically performs a biometric scan. For example, the biometric scanner may include a fingerprint scanner, embedded in the banking button, that scans a fingerprint of a user pressing the banking button; a camera that captures an image of the user that presses the banking button, a microphone that listens for a voice signal from the user that presses the banking button, and/or the like. Accordingly, the biometric scanner can be used to determine that the user that pressed the banking button is the customer associated with the financial account of the financial institution.

In some implementations, the remote control device may locally store biometric signatures associated with the customer. For example, the remote control device may store a plurality of biometric signatures associated with a group of customers (e.g., a family of users that use the presentation device and/or have accounts with the financial institution) that are expected to use the remote control device to access financial accounts through the presentation device. The biometric signatures may be stored with corresponding account information that identifies corresponding accounts of the group of customers. In such cases, the remote control device may provide the account information (e.g., an account number, a name of the customer, and/or the like), associated with the customer that pressed the banking button, to the media device to enable the media device to access the corresponding account of the customer. Accordingly, locally storing the biometric signatures associated with the customer can conserve communication resources of the remote control device, and/or processing resources or network resources that may otherwise be consumed by the remote control and/or media device having to send the biometric information to a separate device (e.g., the media device or the financial services platform) for verification.

Additionally, or alternatively, the remote control device may send the biometric information from a biometric scan of a customer that pressed the banking button to the media device. In such cases, the media device may verify the customer identity through a similar data structure of signatures with corresponding account information that is stored locally on the media device and/or externally (e.g., in a data structure of signatures maintained by the financial services platform). Accordingly, resources on the remote control device (which may have limited resources) can be conserved. Furthermore, the media device verifying the customer identity may conserve network resources that may otherwise be used to send the biometric information for verification.

In some implementations, both the remote control device and media device may use biometric scanners to verify an identity of the customer. For example, the media device may compare biometric information and/or verification information obtained by a biometric scanner of the remote control device with biometric information and/or verification information from a biometric scanner of the media device. In such cases, multi-factor verification can be performed to increase the security and/or privacy of the financial information or financial service received. For example, a gait of a user holding the remote control device can be measured using a sensor (e.g., an accelerometer, gyroscope, inertial sensor, and/or the like) of the remote control device and the gait of the user can be observed using a camera associated with the media device. In such cases, the measured gaits can be compared to verify that the customer that is holding the remote control is the customer that is within a viewing area (e.g., a room) of the media device. Accordingly, the remote control device and media device may use the same or different types of biometric scans to obtain separate biometric information that can be compared to verify the customer is an authorized user and/or is present within an environment of the presentation device that may be used to provide the financial information and/or financial service.

In some implementations, the media device may receive, from the remote control device, control information associated with navigating the financial services platform. For example, through inputs (e.g., buttons, a keypad, a microphone, a touchscreen, and/or the like) on the remote control device, the remote control device may provide control information such that the customer can access and/or receive desired financial information associated with a financial account and/or access and/or receive a desired financial service. Furthermore, in some implementations, the remote control device may be a functioning remote control device capable of being used to perform operations associated with the media device and/or presentation device. For example, the remote control device may be used to adjust a volume of the media device and/or presentation device, change a channel of the media device and/or presentation device, change a signal input of the media device and/or presentation device, adjust a setting of the media device and/or presentation device, access a viewing guide of the media device and/or presentation device, access a streaming application or service associated with the media device and/or presentation device, and/or the like.

Accordingly, example implementation 100 of FIGS. 1A and 1B provides a remote control device and/or media device that enables access to a financial institution. Using example implementation 100, a customer may receive an enhanced user experience when interacting with the financial institution by being able to utilize the remote control device, media device, and/or presentation device to access and/or receive a service from the financial institution, rather than using a user device, which may be unavailable and/or have a small display relative to the presentation device.

As indicated above, FIGS. 1A-1B are provided merely as an example. Other examples are possible and may differ from what was described with regard to FIGS. 1A-1B.

Figure 2:
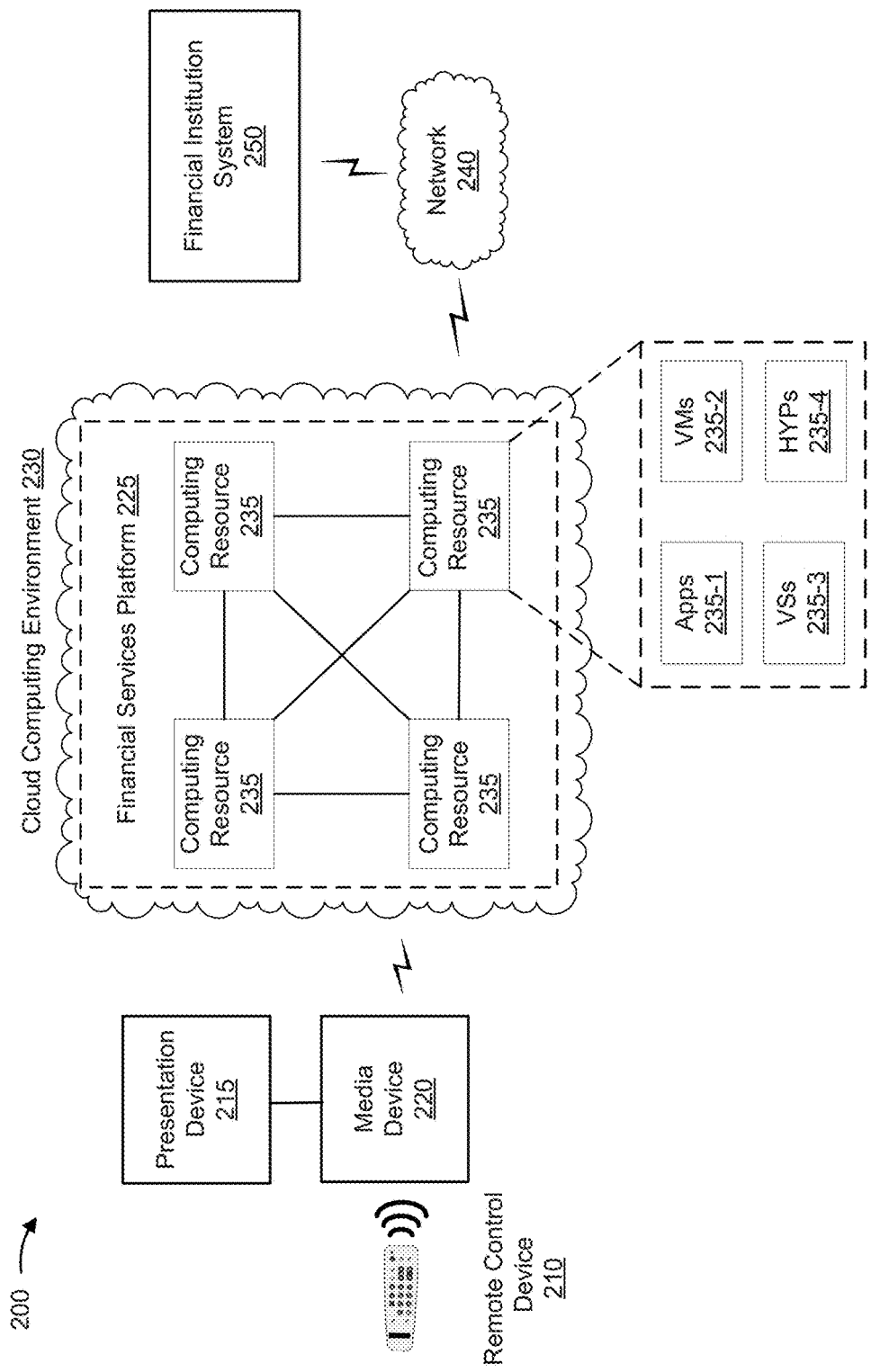
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a remote control device 210, a presentation device 215, a media device 220, a financial services platform 225 hosted in a cloud computing environment 230 that includes computing resources 235. Also included in the environment 200 is a network 240; and a financial institution system 250. Devices of environment 200 may interconnect via wired connections, wireless connections, or a combination of wired and wireless connections.

Remote control device 210 includes a wireless device capable of communicating with media device 220. The remote control device 210 may include one or more input components (e.g., one or more mechanical buttons, one or more electronic buttons, one or more sensors, a keypad, a number pad, a touch screen, a microphone, and/or the like) to control and/or provide input to media device 220. According to some implementations, remote control device 210 may be configured to only communicate with media device 220 (i.e., remote control device 210 may not be configured to communicate with any device other than media device 220). The remote control device 210 may include a banking button, which may be a dedicated input component, that, when pressed, causes media device 220 to access financial services platform 225 and/or provide financial information or a financial service via media device 220 (e.g., by displaying the financial information or information associated with the financial service, by facilitating communication via media device 220, and/or the like). In some implementations, a single press of the banking button can provide connection to financial services platform 225 and/or financial institution system 250 via presentation device 215 and/or media device 220. Accordingly, the banking button may be preprogrammed for communication with only a financial services platform 225 and/or financial institution system 250, via media device 220. Furthermore, such preprogramming may not be changed or adjustable. Remote control device 210 may include a biometric scanner capable of generating biometric information associated with a customer interacting with remote control device 210.

Presentation device 215 includes one or more devices capable of displaying an image on a screen. For example, the presentation device 215 may include a liquid crystal display (LCD), a light emitting diode (LED) display, an organic LED (OLED) display, a projection display, a cathode ray tube (CRT) display, a touchscreen display, and/or the like. In some implementations, presentation device 215 may include a camera, a microphone, and/or the like. In some implementations, presentation device 215 can be used for audio and/or video communication (e.g., with a representative of a financial institution associated with financial services platform 225 and financial institution system 250).

Media device 220 includes at least one of a set top box (STB), a videocassette recorder (VCR), a digital virtual disc (DVD) player, a BLU-RAY™ player, a gaming console, a media streaming device, a casting device (e.g., a casting stick, casting dongle, and/or the like), a cable card, a media access card, and/or the like. Although shown separately in environment 200, in some implementations, media device 220 may include presentation device 215 and/or vice versa. For example, media device 220 can be combined with presentation device 215 in a similar fashion as a smart television (e.g., a television that is capable of storing, processing, and/or executing applications). In some implementations, media device 220 may include a biometric scanner, a microphone, a camera, and/or the like.

Financial services platform 225 includes one or more devices (e.g., computing resources 235) capable of providing financial services via media device 220. For example, financial services platform 225 may be capable of receiving a request for a financial service from media device 220, obtaining information associated with a financial account of the request from financial institution system 250, and providing the financial service associated with the financial account via media device 220. In some implementations, financial services platform 225 may verify customer identification based on verification information received from media device 220.

Cloud computing environment 230 includes an environment that delivers computing as a service, whereby shared resources, services, etc. may be provided to media device 220. Cloud computing environment 230 may provide computation, software, data access, storage, and/or other services that do not require end-user knowledge of a physical location and configuration of a system and/or a device that delivers the services. As shown, cloud computing environment 230 may include financial services platform 225 and computing resource 235.

Computing resource 235 includes one or more personal computers, workstation computers, server devices, or another type of computation and/or communication device. In some implementations, computing resource 235 may host financial services platform 225. The cloud resources may include compute instances executing in computing resource 235, storage devices provided in computing resource 235, data transfer devices provided by computing resource 235, etc. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, or the like.

Application 235-1 includes one or more software applications that may be provided to or accessed by media device 220. Application 235-1 may eliminate a need to install and execute the software applications on media device 220. For example, application 235-1 may include software associated with financial services platform 225 and/or any other software capable of being provided via cloud computing environment 230. In some implementations, one application 235-1 may send/receive information to/from one or more other applications 235-1, via virtual machine 235-2.

Virtual machine 235-2 includes a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program, and may support a single process. In some implementations, virtual machine 235-2 may execute on behalf of a user (e.g., media device 220), and may manage infrastructure of cloud computing environment 230, such as data management, synchronization, or long-duration data transfers.

Virtualized storage 235-3 includes one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 provides hardware virtualization techniques that allow multiple operating systems (e.g., "guest operating systems") to execute concurrently on a host computer, such as computing resource 235. Hypervisor 235-4 may present a virtual operating platform to the guest operating systems, and may manage the execution of the guest operating systems. Multiple instances of a variety of operating systems may share virtualized hardware resources.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

Financial institution system 250 includes one or more devices capable of generating, storing, processing, authorizing and/or providing financial information and/or services. For example, financial institution system 250 may include one or more servers, computers, and/or environments to store and/or provide information (e.g., authorizations, balances, transaction tokens, security information, account information, and/or the like) associated with a financial account of a customer associated with media device 220. The financial institution system 250 may be configured to provide the financial services and/or financial information associated with financial accounts of customers via financial services platform 225.

In some implementations, a secure end-to-end connection can be established between media device 220 (and/or presentation device 215) to financial services platform 225 and/or financial institution system 250. For example, media device 220 may establish an encryption-based communication session, a secure tunnel, and/or the like.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
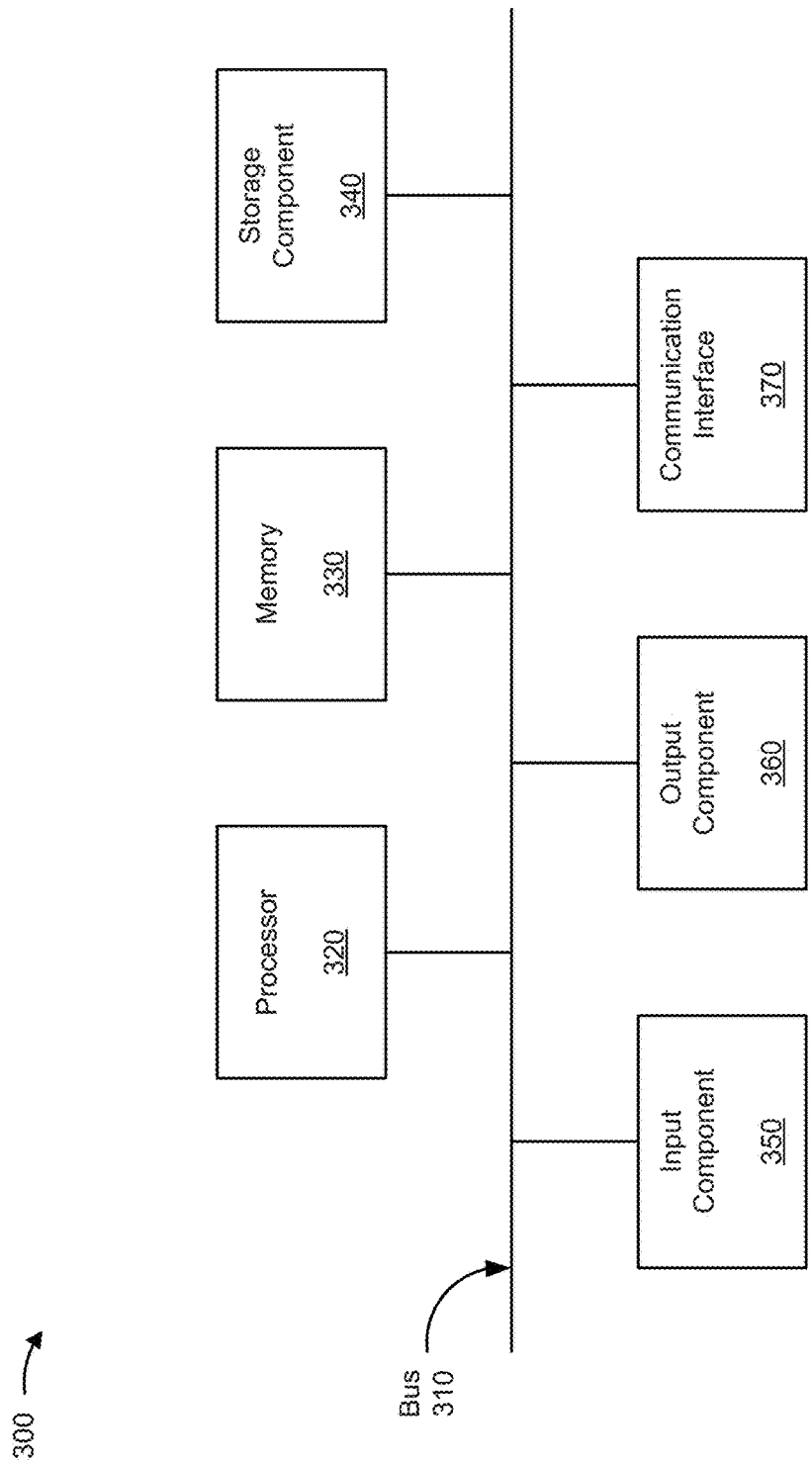
FIG. 3 is a diagram of example components of one or more devices of FIG. 2.

FIG. 3 is a diagram of example components of a device 300. Device 300 may correspond to remote control device 210, media device 220, financial services platform 225 hosted within cloud computing environment 230, computing resource 235, and/or financial institution system 250. In some implementations, remote control device 210, media device 220, financial services platform 225 hosted within cloud computing environment 230, computing resource 235, and/or financial institution system 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
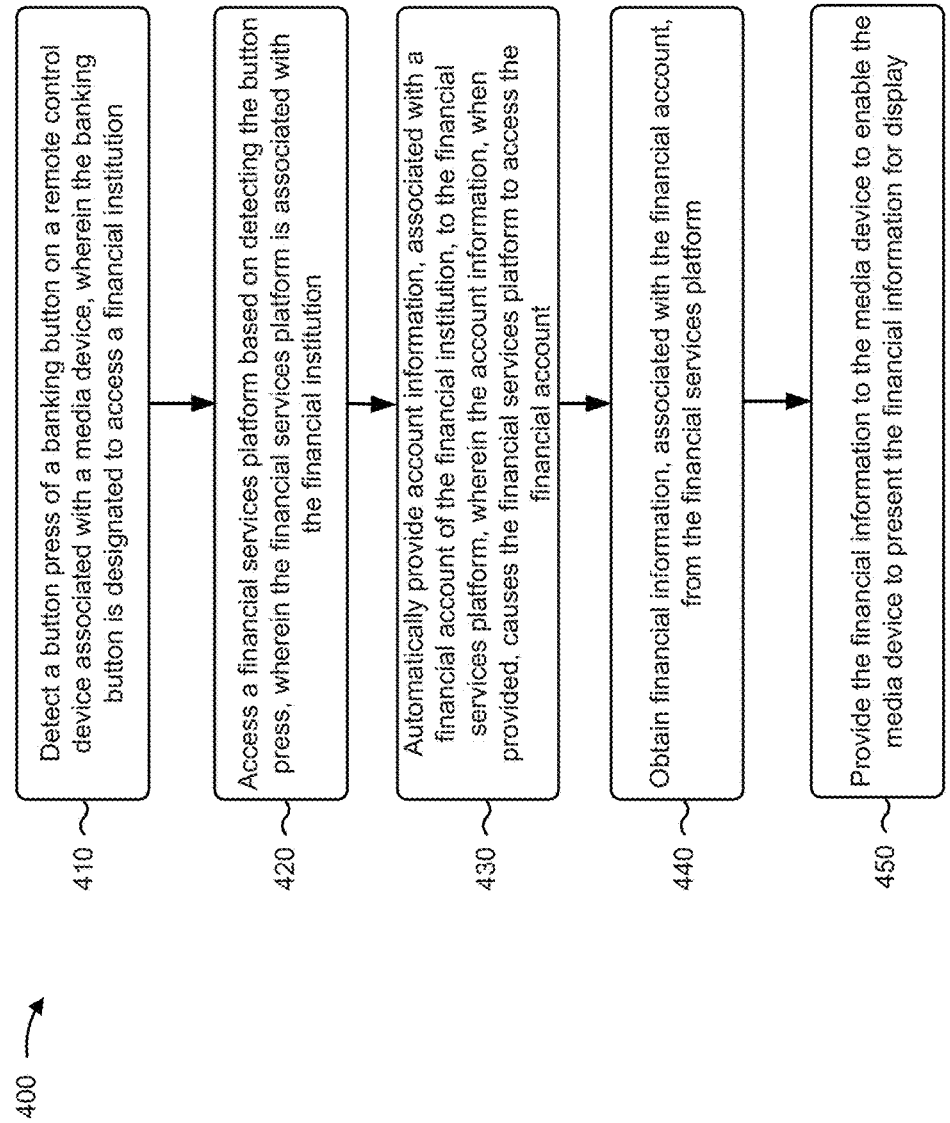
FIG. 4-6 are flow charts of example processes for accessing a financial service using a media device.

FIG. 4 is a flow chart of an example process 400 for accessing a financial service using a media device. In some implementations, one or more process blocks of FIG. 4 may be performed by media device 220. In some implementations, one or more process blocks of FIG. 4 may be performed by another device or a group of devices separate from or including media device 220, such as remote control device 210, financial services platform 225, computing resource 235, and/or financial institution system 250.

As shown in FIG. 4, process 400 may include detecting a button press of a banking button on a remote control device associated with a media device, wherein the banking button is designated to access a financial institution (block 410). For example, remote control device 210 and/or media device 220 (e.g., using processor 320, using input component 350, communication interface 370, and/or the like) may detect the button press of the banking button on remote control device 210, as described above in connection with FIGS. 1A-1B. In some implementations, remote control device 210 and/or media device 220 may detect the button press based on a user (e.g., a customer) interacting with the banking button to cause the button press.

As further shown in FIG. 4, process 400 may include accessing a financial services platform based on detecting the button press, wherein the financial services platform is associated with the financial institution (block 420). For example, media device 220 (e.g., using processor 320, communication interface 370, and/or the like) may access financial services platform 225, as described above in connection with FIGS. 1A-1B. In some implementations, media device 220 may access financial services platform 225 based on being in communication with financial services platform 225, based on being configured to access financial services platform 225 when the button press of the banking button is detected, based on including an application associated with financial services platform 225, based on remote control device 210 being programmed to control media device 220, and/or the like.

As further shown in FIG. 4, process 400 may include automatically providing account information, associated with a financial account of the financial institution, to the financial services platform, wherein the account information, when provided, causes the financial services platform to access the financial account (block 430). For example, media device 220 (e.g., using processor 320, communication interface 370, and/or the like) may automatically provide the account information to financial services platform 225, as described in connection with FIGS. 1A-1B. In some implementations, media device 220 may automatically provide the account information to financial services platform 225 based on detecting the button press of the banking button, being in communication with financial services platform 225, being configured to access the financial account of the financial institution, and/or the like.

As further shown in FIG. 4, process 400 may include obtaining financial information, associated with the financial account, from the financial services platform (block 440). For example, media device 220 (e.g., using processor 320, communication interface 370, and/or the like) may obtain the financial information from financial services platform 225, as described above in connection with FIGS. 1A-1B. In some implementations, media device 220 may obtain the financial information based on providing the account information associated with the financial account.

As further shown in FIG. 4, process 400 may include providing the financial information to the media device to enable the media device to present the financial information for display (block 450). For example, media device 220 (e.g., using processor 320, communication interface 370, and/or the like) may provide the financial information to a presentation device associated with the media device, as described above in connection with FIGS. 1A-1B. In some implementations, media device 220 provides the financial information to the presentation device of the media device 220 based on obtaining the financial information from financial services platform 225.

Process 400 may include additional implementations, such as any single implementation or any combination of implementations described below and/or described in connection with FIG. 5 and/or FIG. 6.

In some implementations, media device 220 obtains verification information from the remote control device, wherein the verification information includes information identifying that a user that performed the button press is associated with the financial account. In some implementations, the verification information includes biometric information from the user.

In some implementations, the button press of the banking button is operable only to access the financial services platform of the financial institution. In some implementations, prior to the button press, remote control device 210 is used to configure access to the financial account based on the button press, wherein remote control device 210 is used to configure access to the financial account based on receiving the account information. Accordingly, the banking button may be designated to initiate a communication with the financial institution.

In some implementations, media device 220 detects an input from the remote control device. In some implementations, media device 220 accesses a financial service of the financial institution via the financial services platform based on detecting the input from the remote control device.

In some implementations, media device 220 may present a graphical user interface, associated with the financial services platform, to permit access to a financial service of the financial institution, wherein the financial service comprises at least one of: a banking account service; a financial consultation service; an investment banking service; a transaction card service; a deposit transaction service; a withdrawal transaction service; a currency transfer service; a loan service; or a cash delivery service.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
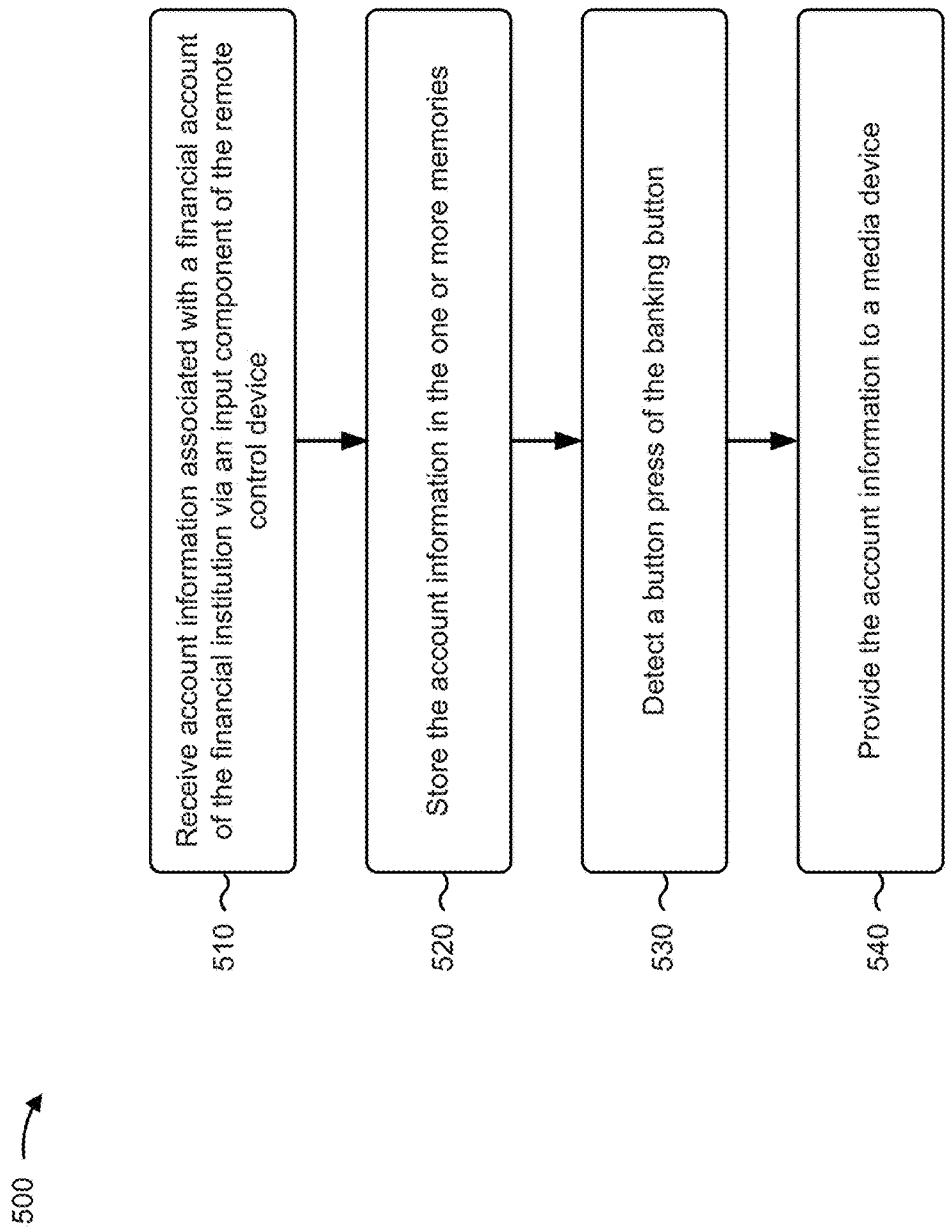

FIG. 5 is a flow chart of an example process 500 for accessing a financial service using a media device. In some implementations, one or more process blocks of FIG. 5 may be performed by remote control device 210. In some implementations, one or more process blocks of FIG. 5 may be performed by another device or a group of devices separate from or including remote control device 210, such as media device 220, financial services platform 225, computing resource 235, and/or financial institution system 250.

As shown in FIG. 5, process 500 may include receiving account information associated with a financial account of the financial institution via an input component of the remote control device (block 510). For example, remote control device 210 (e.g., using processor 320, input component 350, communication interface 370, and/or the like) may receive the account information associated with the financial account, as described above in connection with FIGS. 1A-1B. In some implementations, remote control device 210 may receive the account information based on being configured to access the financial account (e.g., during a setup operation), based on being configured to control media device 220, based on being powered on and/or activated by a customer or representative of the financial institution, and/or the like.

As further shown in FIG. 5, process 500 may include storing the account information in the one or more memories (block 520). For example, remote control device 210 (e.g., using processor 320, storage component 340, and/or the like) may store the account information, as described above in connection with FIGS. 1A-1B. In some implementations, remote control device 210 may store the account information based on receiving the account information.

As further shown in FIG. 5, process 500 may include detecting a button press of the banking button (block 530). For example, remote control device 210 (e.g., using processor 320, input component 350, and/or the like) may detect the button press, as described above in connection with FIGS. 1A-1B. In some implementations, remote control device 210 may detect the button press based on a user (e.g., an authorized user or unauthorized user) pressing the banking button.

As further shown in FIG. 5, process 500 may include providing the account information to the media device (block 540). For example, remote control device 210 (e.g., using processor 320, communication interface 370, and/or the like) may provide the account information to media device 220, as described above in connection with FIGS. 1A-1B. In some implementations, providing the account information to media device 220 causes media device 220 to: access financial services platform 225 based on detecting the button press, wherein financial services platform 225 is associated with the financial institution; automatically provide the account information, associated with the financial account of the financial institution, to financial services platform 225, wherein the account information, when provided, causes financial services platform 225 to access the financial account; obtain financial information, associated with the financial account, from financial services platform 225, and present the financial information for display to enable an interaction with the financial account via remote control device 210.

Process 500 may include additional implementations, such as any single implementation or any combination of implementations described below and/or described in connection with FIG. 4 and/or FIG. 6.

In some implementations, remote control device 210 includes a biometric scanner. In some implementations, the biometric scanner is associated with the banking button. In some implementations, remote control device 210 determines whether a first user that pressed the banking button is associated with the financial account and verifies that the first user that pressed the banking button is associated with the financial account based on biometric information, associated with the first user, that is obtained by the biometric scanner. In some implementations, when providing the account information to the media device, remote control device 210 provides the account information to the media device based on verifying that the first user that pressed the banking button is associated with the financial account.

In some implementations, remote control device 210 receives an input via the input component of the remote control device to access, via media device 220, a financial service of the financial institution. In some implementations, the remote control device 210 is capable of communicating with media device 220 via at least one of an IR signal, an RF signal, or a short range wireless communication signal. In some implementations, media device 220 is communicatively coupled with the financial institution via network 240 and remote control device 210 is capable of being communicatively coupled with the financial institution only via media device 220.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
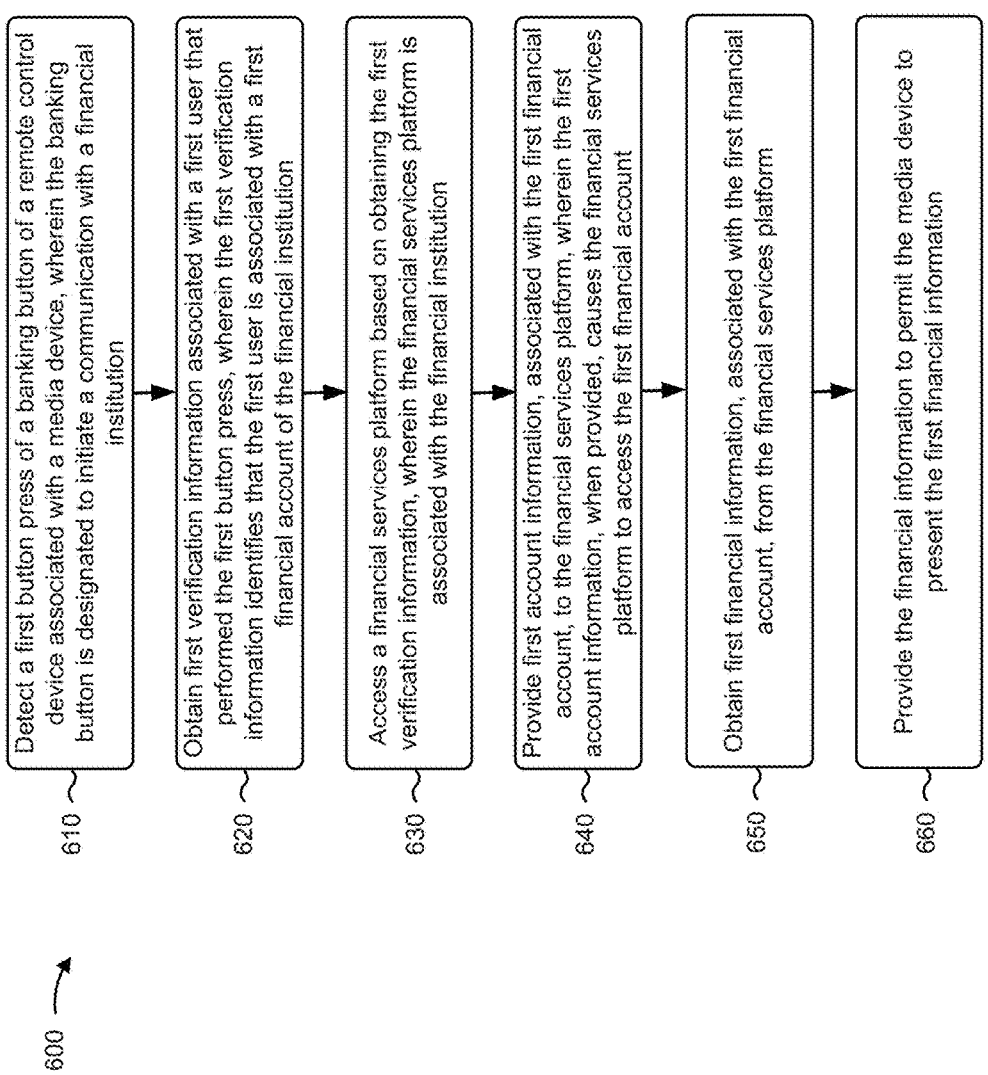

FIG. 6 is a flow chart of an example process 600 for accessing a financial service using a media device. In some implementations, one or more process blocks of FIG. 6 may be performed by media device 220. In some implementations, one or more process blocks of FIG. 6 may be performed by another device or a group of devices separate from or including media device 220, such as remote control device 210, financial services platform 225, computing resource 235, and/or financial institution system 250.

As shown in FIG. 6, process 600 may include detecting a first button press of a banking button of a remote control device associated with a media device, wherein the banking button is designated to initiate a communication with a financial institution (block 610). For example, media device 220 (e.g., using processor 320, communication interface 370, and/or the like) may detect the first button press of the banking button, as described above in connection with FIGS. 1A-1B.

As further shown in FIG. 6, process 600 may include obtaining first verification information associated with a first user that performed the first button press, wherein the first verification information identifies that the first user is associated with a first financial account of the financial institution (block 620). For example, media device 220 (e.g., using processor 320, communication interface 370, and/or the like) may obtain the first verification information, as described above in connection with FIGS. 1A-1B.

As further shown in FIG. 6, process 600 may include accessing a financial services platform based on obtaining the first verification information, wherein the financial services platform is associated with the financial institution (block 630). For example, media device 220 (e.g., using processor 320, communication interface 370, and/or the like) may access financial services platform 225, as described above in connection with FIGS. 1A-1B.

As further shown in FIG. 6, process 600 may include providing first account information, associated with the first financial account, to the financial services platform, wherein the first account information, when provided, causes the financial services platform to access the first financial account (block 640). For example, media device 220 (e.g., using processor 320, communication interface 370, and/or the like) may provide the first account information to financial services platform 225, as described above in connection with FIGS. 1A-1B.

As further shown in FIG. 6, process 600 may include obtaining first financial information, associated with the first financial account, from the financial services platform (block 650). For example, media device 220 (e.g., using processor 320, communication interface 370, and/or the like) may obtain the first financial information, as described above in connection with FIGS. 1A-1B.

As further shown in FIG. 6, process 600 may include providing the first financial information to permit the media device to present the first financial information (block 660). For example, media device 220 (e.g., using processor 320, communication interface 370, and/or the like) may provide the first financial information, as described above in connection with FIGS. 1A-1B.

Process 600 may include additional implementations, such as any single implementation or any combination of implementations described below and/or described in connection with FIG. 4 and/or FIG. 5.

In some implementations, media device 220 receives the first account information associated with the first financial account of the financial institution via a user interface of the remote control device and store the first account information in a data structure. In some implementations, when providing the first account information, media device 220 obtains the first account information from the data structure and provides the first account information to financial services platform 225.

In some implementations, media device 220 detects a second button press of the banking button of the remote control device; obtains second verification information associated with a second user that performed the second button press, wherein the second verification information identifies that the second user is not associated with the first financial account of the financial institution; and prevents access to financial services platform 225 based on the second user not being associated with the first financial account.

In some implementations, media device 220 receives at least one of an infrared signal, a radio frequency (RF) transmission, or a short range wireless communication signal indicating that the banking button was pressed, and detects the first button press based on the infrared signal, the RF transmission, or the short range wireless communication signal.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

According to some implementations, described herein, remote control device 210 and/or a media device 220 may be used to access and/or receive a financial service from a financial institution. In some implementations, a dedicated banking button of the remote control device can be used to access or receive the financial services. Accordingly, the banking, being readily available on the remote control device, may enable a customer to quickly and effectively access financial information associated with a financial account of the customer. Furthermore, the remote control device and/or media device can provide an enhanced user experience over previous techniques by easily and quickly enabling enlarged viewing of financial information on a large presentation device at the touch of a single button of the remote control device.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a media device, at least one of:
      an infrared signal,
      a radio frequency (RF) transmission, or
      a short range wireless communication signal,
         the at least one of the infrared signal, the RF transmission, or the short range wireless communication signal indicating that a banking button on a remote control device was pressed to access a financial services platform of a financial institution,
   the media device including at least one of:
      a set top box,
      a videocassette recorder,
      a digital virtual disc player,
      a BLU-RAY™ player,
      a gaming console,
      a media streaming device,
      a casting device,
      a cable card, or
      a media access card, and
      the remote control device being associated with the media device;
   obtaining, by the media device, first verification information from the remote control device,
      the first verification information being associated with first biometric information of a user associated with the remote control device, and
      the first verification information being obtained from a first biometric scanner associated with the remote control device;
   obtaining, by the media device, second verification information associated with the user,
      the second verification information being received from a second biometric scanner associated with the media device and including second biometric information;
   comparing, by the media device, the first biometric information associated with the first verification information with the second biometric information associated with the second verification information to verify that the user associated with the remote control device is associated with a financial account to increase security associated with the financial account,
      the financial account being associated with the financial services platform;
   accessing, by the media device, the financial services platform based on verifying that the user is associated with the financial account;
   automatically providing, by the media device, account information, associated with the financial account of the user, to the financial services platform,
      wherein the account information provided causes the financial services platform to access the financial account;
   obtaining, by the media device, financial information, associated with the financial account, from the financial services platform; and
   providing, by the media device, the financial information to a presentation device associated with the media device for display.

2. The method of claim 1, wherein the first biometric information from the user includes at least one of:
   a fingerprint scan,
   a palm scan,
   a facial recognition analysis,
   a voice recognition analysis,
   a gait recognition analysis, or
   a retinal scan.

3. The method of claim 1, wherein the button press of the banking button is operable only to access the financial services platform of the financial institution.

4. The method of claim 1, wherein, prior to the button press, the remote control device is used to configure access to the financial account based on the button press,
   wherein the remote control device is used to configure access to the financial account based on receiving the account information.

5. The method of claim 1, further comprising:
   detecting an input from the remote control device; and
   accessing a financial service of the financial institution via the financial services platform based on detecting the input from the remote control device.

6. The method of claim 1, further comprising:
   causing the media device to present a graphical user interface, associated with the financial services platform, for accessing a financial service of the financial institution, wherein the financial service comprises at least one of:
  a banking account service;
  a financial consultation service;
  an investment banking service;
  a transaction card service;
  a deposit transaction service;
  a withdrawal transaction service;
  a currency transfer service;
  a loan service; or
  a cash delivery service.

7. A remote control device associated with a media device, the remote control device comprising:
  a banking button,
    wherein the banking button is designated to solely access a financial services platform of a financial institution;
  one or more memories; and
  one or more processors, communicatively coupled to the one or more memories, to:
    receive account information associated with a financial account of the financial institution via an input component of the remote control device;
    store the account information in the one or more memories;
    provide, to the media device, at least one of:
      an infrared signal,
      a radio frequency (RF) transmission, or
      a short range wireless communication signal,
      the at least one of the infrared signal, the RF transmission, or the short range wireless communication signal indicating that the banking button on the remote control device was pressed,
      the media device including at least one of:
        a set top box,
        a videocassette recorder,
        a digital virtual disc player,
        a BLU-RAY™ player,
        a gaming console,
        a media streaming device,
        a casting device,
        a cable card, or
    a media access card;
    provide the account information to the media device to cause the media device to:
      obtain first verification information from the remote control device,
        the first verification information being associated with first biometric information of a user associated with the remote control device, and
        the first verification information being obtained from a first biometric scanner associated with the remote control device;
      obtain second verification information associated with the user,
        the second verification information being received from a second biometric scanner associated with the media device, and
        the second verification information being associated with second biometric information of the user;
      compare the first verification information with the second verification information to verify that the user associated with the remote control device is associated with the financial account to increase security associated with the financial account,
        the financial account being associated with the financial services platform;
      access the financial services platform based on verifying that the user is associated with financial account;
      automatically provide the account information, associated with the financial account of the user, to the financial services platform,
        wherein the account information provided causes the financial services platform to access the financial account;
      obtain financial information, associated with the financial account, from the financial services platform; and
      present the financial information for display to enable an interaction with the financial account via the remote control device.

8. The remote control device of claim 7, wherein the first biometric scanner is associated with the banking button.

9. The remote control device of claim 7, wherein the one or more processors are further to:
  receive an input via the input component of the remote control device to access, via the media device, a financial service of the financial institution.

10. The remote control device of claim 7, wherein the interaction comprises at least one of:
  accessing a banking account service;
  receiving a financial consultation service;
  accessing an investment banking service;
  receiving a transaction card service;
  performing a deposit transaction;
  performing a withdrawal transaction;
  performing a currency transfer;
  performing a bill payment;
  accessing a loan service; or
  requesting a cash delivery service.

11. The remote control device of claim 7, wherein the first biometric information from the user includes at least one of:
  a fingerprint scan,
  a palm scan,
  a facial recognition analysis,
  a voice recognition analysis,
  a gait recognition analysis, or
  a retinal scan.

12. The remote control device of claim 7, wherein the media device is communicatively coupled with the financial institution via a network and the remote control device is communicatively coupled with the financial institution only via the media device.

13. A non-transitory computer-readable medium storing instructions, the instructions comprising:
  one or more instructions that, when executed by one or more processors of a media device, cause the one or more processors to:
    receive at least one of:
      an infrared signal,
      a radio frequency (RF) transmission, or
      a short range wireless communication signal,
      the at least one of the infrared signal, the RF transmission, or the short range wireless communication signal indicating that a banking button on a remote control device was pressed to access a financial services platform of a financial institution,
      the media device including at least one of:
        a set top box,
        a videocassette recorder,
        a digital virtual disc player,
        a BLU-RAY™ player, a gaming console,
a media streaming device,
a casting device,
a cable card, or
a media access card, and
the remote control device being associated with the media device,
obtain first verification information from the remote control device,
the first verification information being associated with first biometric information of a user associated with the remote control device, and
the first verification information being obtained from a first biometric scanner associated with the remote control device;
obtain second verification information associated with the user,
the second verification information being received from a second biometric scanner associated with the media device; and
the second verification information being associated with second biometric information of the user;
compare the first verification information with the second verification information to verify that the user associated with the remote control device is associated with a financial account to increase security associated with the financial account,
the financial account being associated with the financial services platform;
access the financial services platform based on verifying that the user is associated with the financial account;
provide account information, associated with the financial account of the user, to the financial services platform,
wherein the account information provided causes the financial services platform to access the financial account;
obtain financial information, associated with the financial account, from the financial services platform; and
provide the financial information to a presentation device associated with the media device for display.

14. The non-transitory computer-readable medium of claim 13, wherein the one or more instructions, when executed by the one or more processors, further cause the one or more processors to:
receive the account information associated with the financial account of the financial institution via a user interface of the remote control device; and
store the account information in a data structure,
wherein the data structure is associated with a virtualized storage system, and
wherein the one or more instructions, that cause the one or more processors to provide the account information, cause the one or more processors to:
obtain the account information from the data structure; and
provide the account information to the financial services platform.

15. The non-transitory computer-readable medium of claim 13, wherein the one or more instructions, when executed by the one or more processors, further cause the one or more processors to:
detect a button press of the banking button of the remote control device;
obtain other verification information associated with another user associated with the remote control device,
wherein the other verification information identifies that the other user is not associated with the financial account of the financial institution; and
prevent access to the financial services platform based on the other user not being associated with the financial account.

16. The non-transitory computer-readable medium of claim 13, wherein the one or more instructions, when executed by the one or more processors, further cause the one or more processors to:
detect a button press of the banking button of the remote control device;
obtain other verification information associated with another user associated with the remote control device,
wherein the other verification information identifies that other user is associated with another financial account of the financial institution;
access the financial services platform based on obtaining the other verification information;
provide other account information, associated with the other financial account, to the financial services platform,
wherein the other account information provided causes the financial services platform to access the other financial account;
obtain other financial information, associated with the other financial account, from the financial services platform; and
provide the other financial information to the presentation device.

17. The non-transitory computer-readable medium of claim 13, wherein the one or more instructions, when executed by the one or more processors, further cause the one or more processors to:
detect an input via a user interface of the remote control device; and
access a financial service of the financial institution via the financial services platform.

18. The method of claim 1, further comprising:
receiving, from the remote control device, information associated with a gait of the user,
the information being captured using a sensor associated with the remote control device,
comparing, by the media device, the information associated with the gait of the user to information associated with an observed gait to verify that the user associated with the remote control device is within a viewing area of the media device,
information related to the observed gait being provided by a camera associated with the media device.

19. The remote control device of claim 7, wherein the one or more processors are further to:
measure a gait of the user associated with the remote control device using a sensor associated with the remote control device;
the measured gait of the user being compared to an observed gait of the user provided by a camera associated with the media device to verify that the user holding the remote control device is within a viewing area of the media device.

20. The non-transitory computer-readable medium of claim 13, wherein the one or more instructions, when executed by the one or more processors, further cause the one or more processors to:

receive, from the remote control device, information associated with a gait of the user,
the information being captured using a sensor associated with the remote control device,
compare, by the media device, the information associated with the gait of the user to information associated with an observed gait to verify that the user associated with the remote control device is within a viewing area of the media device,
information related to the observed gait being provided by a camera associated with the media device.

\* \* \* \* \*